United States Patent [19]

Fisher

[11] Patent Number: 5,694,562

[45] Date of Patent: Dec. 2, 1997

[54] CLOSELY INTEGRATED KEY ICONS IN A GRAPHICAL INTERFACE

[76] Inventor: Thomas A. Fisher, 404D Ridgefield Cir., Clinton, Mass. 10510

[21] Appl. No.: 373,561

[22] Filed: Jan. 17, 1995

[51] Int. Cl.⁶ .................................................. G06F 15/00
[52] U.S. Cl. ...................... 395/349; 395/352; 395/970; 395/977
[58] Field of Search .......................... 395/155–161, 395/149, 326–358, 970, 977; 345/117–120, 146, 902, 168–180; 364/188–190; 341/22; 382/187, 309–311

[56] References Cited

U.S. PATENT DOCUMENTS

| | | | |
|---|---|---|---|
| 4,079,450 | 3/1978 | Grimm et al. | 345/180 |
| 4,862,389 | 8/1989 | Takagi | 395/157 |
| 4,899,136 | 2/1990 | Beard et al. | 395/159 |
| 5,121,477 | 6/1992 | Koopmans et al. | 395/156 |
| 5,179,653 | 1/1993 | Fuller | 395/156 |
| 5,276,794 | 1/1994 | Lamb, Jr. et al. | 395/161 X |
| 5,287,514 | 2/1994 | Gram | 395/156 X |
| 5,437,044 | 7/1995 | Hohner et al. | 364/189 |
| 5,457,454 | 10/1995 | Sugano | 345/179 |
| 5,459,796 | 10/1995 | Boyer | 392/187 |
| 5,491,495 | 2/1996 | Ward et al. | 345/173 |

OTHER PUBLICATIONS

Advanced Interface Design Guide, IBM Corp., Jun. 1989, pp. 26–29, 55–58, 97, 167.

Primary Examiner—John E. Breene
Attorney, Agent, or Firm—Gerald J. Cechony

[57] ABSTRACT

"Key icons in a graphical user interface for a computer system resemble physical keys on the keyboard and are closely integrated with the functionalities they invoke. A desired functionality may be invoked by pointing and clicking the associated key icon, or by physically pressing the corresponding key on the keyboard. In either case, the key icon changes its appearance to resemble a depressed key in response to the pressing of the physical key or to selecting the key icon. Key icons may invoke a menu function."

4 Claims, 1 Drawing Sheet

CLOSELY INTEGRATED KEY ICONS IN A GRAPHICAL INTERFACE

FIELD OF THE INVENTION

This invention relates to graphical user interfaces as presented on computer displays, particularly to the action of icons presented on such graphical user interfaces.

PRIOR ART

As user applications for computers evolved, traditionally a keyboard device was used both for entering data and for controlling the computer and the application program. Keyboards for such purposes are equipped with special keys such as the CONTROL and ALT key that modify the meanings of alphanumeric keys pressed in conjunction with them, or with additional keys often known as FUNCTION keys, each of which may be correlated by an application program with a particular function.

In recent years, graphical user interfaces ("GUI's") have come into widespread use, perhaps most ubiquitously in the Windows (tm) environment from Microsoft Corporation. Typically in such interfaces, though a keyboard is still used for data entry, functions used in controlling the computer or the application program are represented graphically on a display screen as "icons", and a particular function is selected by "point and click" methods—the computer is equipped with a pointing device, commonly a "mouse" which the user physically moves on a horizontal surface to effect corresponding movement of a cursor or pointer on the screen; when the pointer is positioned on the icon representing a desired function, the user "clicks", i.e., presses a button on the mouse to invoke that function.

Two drawbacks of point-and-click icon selection have become evident. One is that some functions do not lend themselves readily to being graphically represented. While a representation of a pair of scissors quite clearly represents a CUT function and a representation of a pastepot clearly represents a PASTE function, many of the icons that are presented in application programs are not self-evident, and are puzzling and intimidating to users.

Another drawback of point-and-click icon selection is that many users find it inconvenient when using their hands on the keyboard for data entry to have to remove their hands from the keyboard in order to manipulate the mouse. Many users from the days before GUI's are accustomed to keeping their hands on the keyboard all the time and doing both data entry with the alphanumeric keys and control functions with the CONTROL, ALT, or FUNCTION keys, and many such users find it time-consuming to have to use point-and-click methods. For this reason, many application programs provide "shortcut keys" or "accelerator keys" to assist such users, whereby a function may be invoked either by pointing and clicking its icon, or by typing some combination of keys. In practice, this is usually awkward since the key combinations usually do not bear any mnemonic relationship to the function being invoked and require the user to memorize numerous key combinations. Also, while it is a goal of GUI's to approach standardization of icons from one program to another, shortcut key combinations tend to vary widely from on application to another and standardization is lost.

Some shortcut keys used in Microsoft Corporation's Word for Windows (tan) word processor program are presented by way of example: 1) A paragraph may be centered horizontally on the page by pointing and clicking an icon that depicts black lines of varying lengths centered horizontally within the icon, or by typing the E key while holding down the CONTROL key; 2) The font size my by changed by clicking on a small window displaying the current font size, or by typing the P key while holding down the CONTROL and SHIFT keys.

It is seen that there is no mnemonic relationship between these shortcut key combinations and the functions they invoke, nor is there any visual on-screen representation of which keys to press to invoke a particular function. Also, when the user elects to use a shortcut key combination in lieu of clicking an icon, he receives no visual acknowledgement of what selection he has made.

SUMMARY OF THE INVENTION

The present invention overcomes these drawbacks of the prior art by providing a graphical user interface in which the icons are depictions of physical keys on the keyboard, and in which the function invoked by each key icon is presented as part of the interface display. A user may invoke a function by pointing and clicking the key icon corresponding to that function, by touching the key icon on a touch screen, or by pressing the physical key depicted in that icon. In either case, the icon becomes animated to acknowledge invocation of the function.

OBJECTS OF THE INVENTION

It is a general object, therefore, of the present invention to provide improved graphical user interfaces.

It is a particular object of the present invention to provide a graphical user interface in which icons are closely integrated with the functionalities they invoke and with shortcut keys that may be used in lieu of them.

It is another particular object of the present invention to provide correlation between screen icons and keyboard keys for invoking a particular function.

BRIEF DESCRIPTION OF THE DRAWINGS

The features and advantages of the present invention will become apparent from the following detailed description of a preferred embodiment thereof, taken in conjunction with the accompanying drawings in which.

Figure 1:
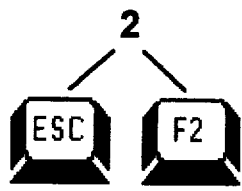
FIG. 1 depicts typical key icons.
Figure 3:
FIG. 3 shows a key icon in animated mode.

DESCRIPTION OF THE PREFERRED EMBODIMENT:

FIG. 1 depicts typical ones of the key icons 2 employed in the present invention. It is seen that they are pictorial representations of physical keys on a keyboard.

Figure 2:
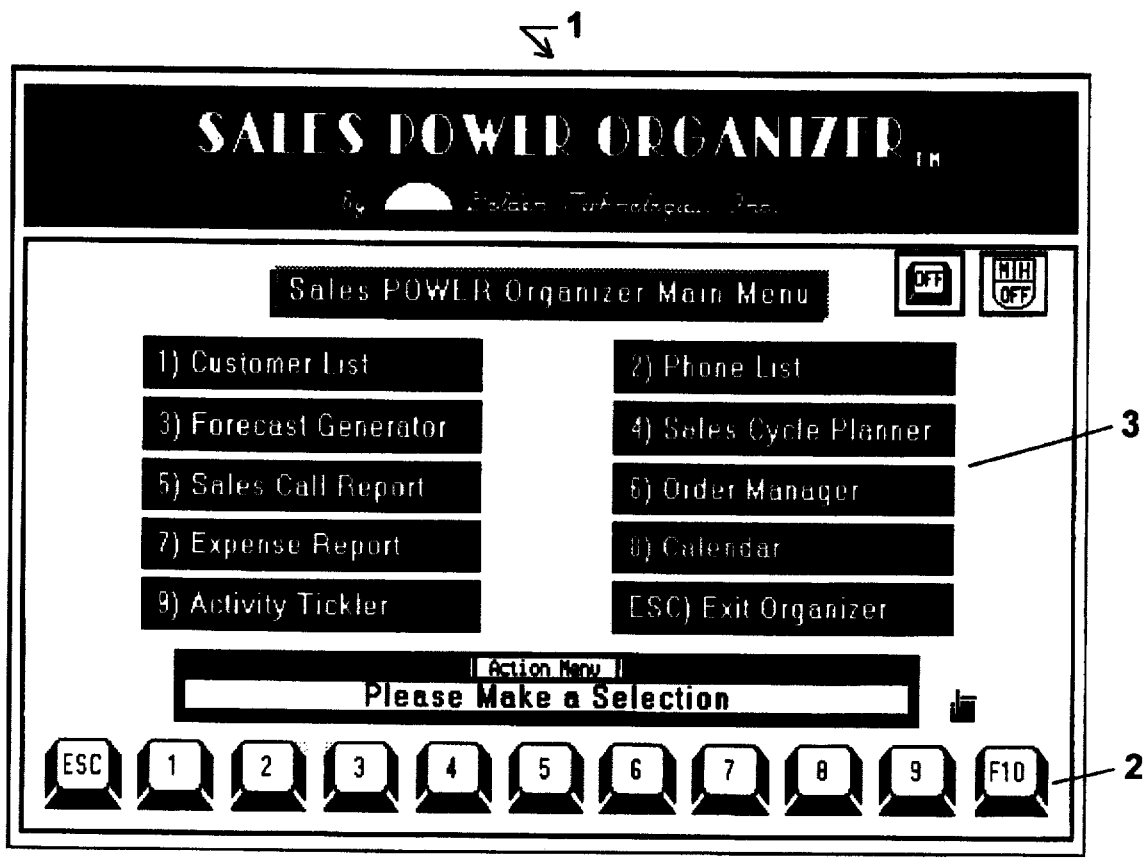
FIG. 2 depicts a graphical user interface including key icons.

FIG. 2 depicts a graphical user interface screen display 1 including key icons 2. Display 1 also includes a menu 3 which lists various functions that may be invoked. Each is associated with a keyboard character (in this particular embodiment, the numbers one through nine and the ESC (Escape) character, and other miscellaneous icons for requesting on-screen help or for turning the key icons on or off.

The user decides upon a function he wishes to invoke, and then selects it. He may do this in either of two ways. For example, suppose he wishes to select "Sales Call Report" which is seen in menu 3 to be identified by a "5". He may, at his option, either click on the "5" key icon on the screen display by using his pointing device (or touch the "5" key icon on a touch screen), or press the "5" key on the keyboard.

Regardless of which method he elects, the corresponding function will be activated. And, regardless of which method he elects, the "5" icon (in the present example) will go into "animate mode". That is, the "5" icon will appear to move in the manner of a physical key being pressed, and it will change color. Animate mode serves as an acknowledgement to the user that function "5" has been selected, regardless of whether by pointing and clicking the "5" icon or pressing the "5" key on the keyboard.

The invention may be embodied in other specific forms without departing from the spirit thereof. The invention is intended to be embraced by the appended claims and not limited by or to the foregoing embodiments.

I claim:

1. In a graphical user interface to be displayed on a computer screen for enabling the user of a computer program to interact with and control said program by selecting icons on the screen display, each icon being associated with a particular function of the program, the computer being equipped with a keyboard, and the program also susceptible of interaction and control by the user's depressing keys on the keyboard, functions of the program being associated with particular keystrokes or sequences or combinations of keystrokes, key icons in the screen display closely integrated with the functionalities each invokes and with the keyboard keys for invoking the corresponding functions, the number of key icons in the screen display being substantially smaller than the number of keys on the keyboard, wherein further the graphical user interface includes a menu of functions, each of which is denoted by an alphanumeric entity, each alphanumeric entity being also contained in an icon on the graphical user interface and on a keytop on the keyboard, and any of said functions is invoked either by selecting its corresponding key icon or by striking its corresponding keytop on the keyboard.

2. In a graphical user interface to be displayed on a computer screen for enabling the user of a computer program to interact with and control said program by selecting icons on the screen display, each icon being associated with a particular function of the program, the computer being equipped with a keyboard, and the program also susceptible of interaction and control by the user's depressing keys on the keyboard, functions of the program being associated with particular keystrokes or sequences or combinations of keystrokes, key icons in the screen display closely integrated with the functionalities each invokes and with the keyboard keys for invoking the corresponding functions, the number of key icons in the screen display being substantially smaller than the number of keys on the keyboard, wherein further each icon in the screen display is a graphical depiction of the keyboard key the depression of which invokes the same function as the selection of the key icon, the graphical user interface includes a menu of functions, each of which is denoted by an alphanumeric entity, each alphanumeric entity being also contained in an icon on the graphical user interface and on a keytop on the keyboard, and any of said functions is invoked either by selecting its corresponding key icon or by striking its corresponding keytop on the keyboard.

3. The graphical user interface of claim 2 wherein further:

when a function is invoked, regardless of whether by selecting its associated key icon or striking its associated keytop, the associated key icon aminates its appearance to that of a depressed keytop and remains that way until the execution of the function commences.

4. The graphical user interface of claim 3 wherein further:

while a key icon has the appearance of a depressed keytop it also is displayed in a color other than the color it had before taking on the appearance of a depressed keytop.

* * * * *